UNITED STATES PATENT OFFICE.

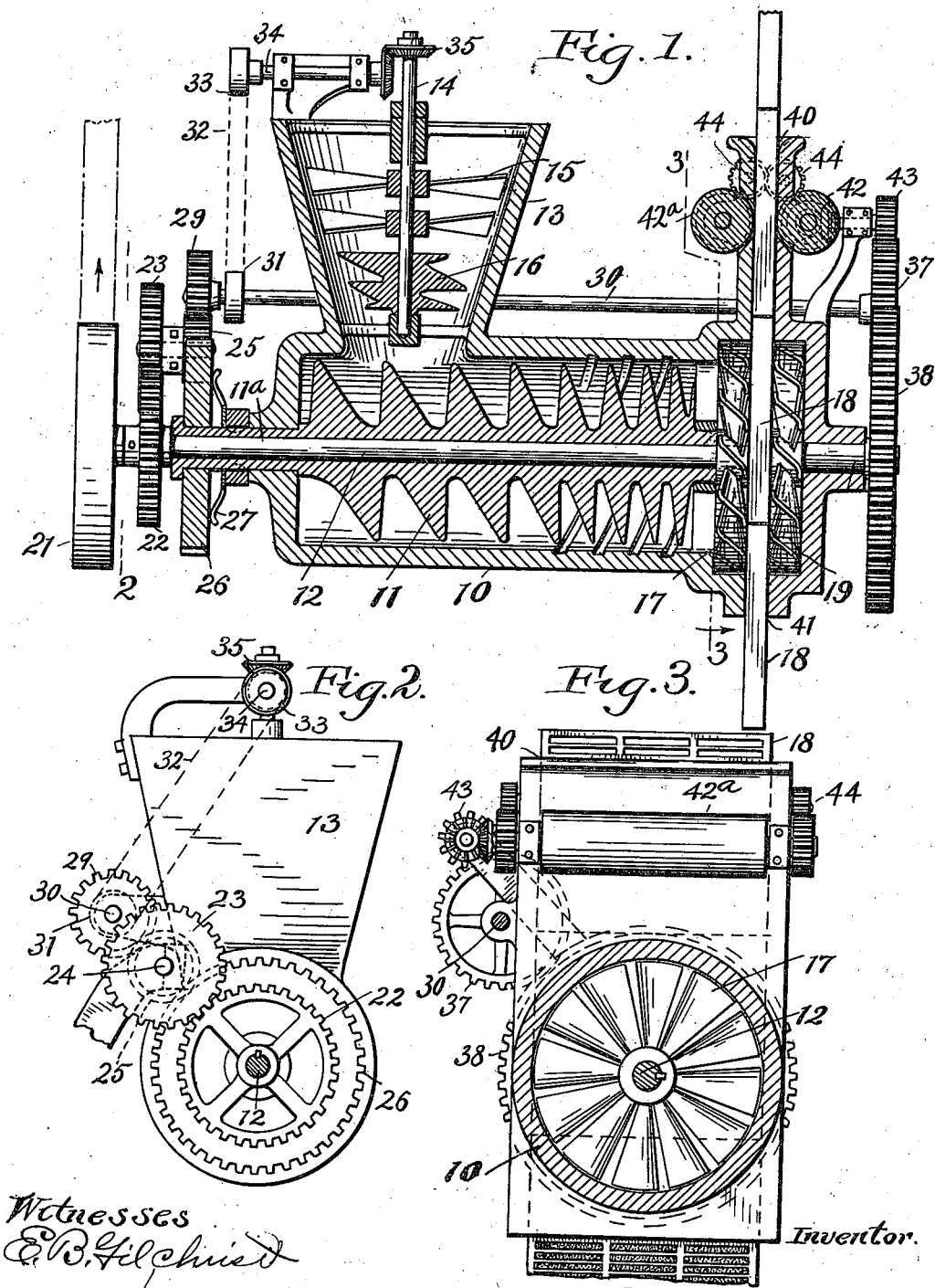

THEODORE A. WILLARD, OF CLEVELAND, OHIO, ASSIGNOR TO WILLARD STORAGE BATTERY COMPANY, OF CLEVELAND, OHIO, A CORPORATION OF WEST VIRGINIA.

GRID-PASTING MACHINE.

1,297,766.   Specification of Letters Patent.   Patented Mar. 18, 1919.

Application filed March 24, 1913. Serial No. 756,422.

*To all whom it may concern:*

Be it known that I, THEODORE A. WILLARD, a citizen of the United States, residing at Cleveland, in the county of Cuyahoga and State of Ohio, have invented a certain new and useful Improvement in Grid-Pasting Machines, of which the following is a full, clear, and exact description.

This invention relates to a pasting machine for storage battery grids, or to a machine for mechanically filling the interstices of the grids with paste or active material.

It is a well known fact that practically all storage battery grids are pasted or filled with paste by hand, and as far as I am aware, no machine has ever been provided which will paste the grids as satisfactorily as they are pasted by hand.

The object of the present invention is to provide a pasting machine by which the grids can be pasted in a very effective manner, and much more rapidly than by hand.

The machine which I have provided includes a suitable paste feeding means which feeds the paste toward or into the grid, and one or more suitable compressing and smoothing devices which are arranged in proper relationship with respect to the feeder, and at its discharge end in such a way that they will compress and force the material into all the interstices, filling well the corners, and, in fact all open spaces and smooth the surfaces so that when the grid passes, or is removed from the compressor or compressors, it will be in the same condition, as if pasted by hand. The grids may be fed mechanically and continuously through the machine in the proper path with respect to the feeder and compressors.

The invention may further be briefly summarized as consisting in certain novel details of construction and combinations and arrangements of parts which will be described in the specification, and set forth in the appended claims.

In the drawings, wherein I have shown an embodiment of the invention which operates satisfactorily, Figure 1 is a vertical longitudinal sectional view through the machine; Fig. 2 is an end view of the same; and Fig. 3 is a transverse sectional view substantially along the line 3—3 of Fig. 1.

The machine includes a feeding chamber 10 which is preferably cylindrical and is arranged in horizontal position. The paste is adapted to be fed endwise through the chamber 10 by a worm or screw feeder 11, the pitch of the thread of which is preferably decreased from the inlet to the discharge end so that the paste will be gradually compressed more and more, as it approaches the discharge end. This spiral feeder surrounds and is partially supported on a horizontal spindle 12 extending axially through the chamber 10. The material is adapted to be fed into the chamber 10 through a hopper 13, into the center of which extends a vertical spindle 14 provided in the upper portion of the hopper with paddles or blades 15, and in the lower portion with a spiral feeder 16. The paste previously mixed may be placed into the hopper, or the hopper may constitute a mixing chamber into which the materials or ingredients of which the paste is composed may be supplied, and will be thoroughly mixed by the revolving blades 15, and thence fed into the feeding chamber 10 beneath by the spiral feeder 16.

As the machine is shown in Fig. 1, the paste will be fed from the left hand end to the right hand end. Situated at the discharge end of the chamber is a revolving compressor 17 in the form of a wheel with radially extending inclined blades, suitably spaced apart. This wheel or compressor is secured to the end of the shaft or spindle 12 which is driven independently of the spiral feeder 11 in a manner hereinafter referred to. The paste forced through the chamber 10 by the spiral feeder 11 and compressed near the discharge end of the chamber passes between the rotating blades of the compressor 17 into a grid 18 on the opposite side of the compressor. The blades compress the paste in the numerous interstices of the grid, and fill all parts of the openings, including their corners, and at the same time, the blades which wipe or pass over the surface of the grid leave the said surface in smooth condition.

I find that a single compressor of the character described answers the purpose very well, providing that on the reverse side of the grid is placed a flat surface against which the material on the opposite side of the grid may be pressed. The best results can be obtained, however, by two oppositely rotating compressors, and hence in the drawings, I have shown a second compressor 19 arranged coaxially with respect to the compressor 17, and spaced from the compressor 17 a distance equal substantially to the thickness of the grid. This compressor 19 is similar to the compressor 17 in all respects, and is secured to a short shaft 20, which is in alinement with the relatively long shaft 12.

The parts so far described are all independently driven by mechanism which may be as follows: Power can be applied through a suitable belt to a pulley 21 secured to the outer end of shaft 12. Secured to the shaft 12 adjacent to pulley 21 is a gear 22 which meshes with a second gear 23 secured to a short shaft 24, to which is secured a smaller gear 25 which meshes with a relatively large gear 26 mounted on a tubular flange 11$^a$ which extends outwardly from the spiral feeder 11 through a suitable opening in the end of the feeding chamber 10. This gear which is adapted to rotate the feeder 11 is preferably connected thereto by a friction clutching means, and in this case is pressed against a suitable shoulder on the end of the tubular flange 11$^a$ of the spiral feeder by means of rather stiff springs 27. This friction clutch device is utilized instead of a positive driving connection in order that the driving gear 26 may slip in case the paste is too densely compressed or fed too fast. The spindle 14 is driven from the parts just described by driving mechanism including a gear 29 secured to a horizontal shaft 30. This shaft is provided adjacent the gear 29 with a pulley 31 connected by a belt 32 to an upper pulley 33 secured to an upper horizontal shaft 34 which is connected by beveled gearing 35 to the upper end of spindle 14.

The compressor 19 is rotated in the reverse direction with respect to the compressor 17 by driving means including a gear 37 which meshes with a larger gear 38 secured to the outer end of the short shaft 20. By the above described mechanism, the shaft 14 with its mixing blades and spiral feeder, the spiral feeder 11 and two compressors 17 and 19 are all rotated at the desired relative speeds.

The speed at which any one of the parts is driven can be varied to suit requirements by interchangeable gearing or through equally well known means. It is not essential, however, that I use the particular form of driving means or devices here illustrated, as these parts can be modified as occasion or circumstances require.

With the mechanism here shown, the spiral feeder 11 is rotated slowly while the compressors 17 and 19 are rotated in opposite directions, and at a much higher rate of speed than the feeder. The relative speeds at which these members will be driven to produce the best results will depend upon conditions which may vary, such as the density of the paste or the thickness of the grid, and I propose to vary the relative speeds of these members to suit requirements.

The grids are preferably fed mechanically through the machine in such a way that they move continuously in a path at right angles to the direction of feed between the two compressors 17 and 19, the space between the blades of the two compressors being substantially equal to the thickness of the grid. In this case, the grids are adapted to be fed in a vertical direction from the top downwardly. Arranged above that part of the chamber 10 which surrounds the compressors is a guide 40 having a narrow slot, whose width and thickness dimensions are substantially that of the corresponding dimensions of the grid, although it is immaterial whether the grids are fed through the machine endwise or sidewise. The slot of the guide 40 is directly above and in alinement with the space between the compressors, so that the grids may be fed downwardly through the guide 40, through the space between the compressors and out from the bottom of the machine beneath the compressors through an outlet slot 41. The mechanical means for feeding the grids in this case consists of two rollers 42 and 42$^a$ which are arranged on opposite sides of the grids so as to frictionally engage the same, and feed the same downwardly.

The roller on one side of the guide 40 is driven by suitable gear connecting means 43, including a gear which meshes with the gear 37 previously referred to. Rotation is transmitted from one roller 42 to the roller 42$^a$ which is located on the opposite side of the guide by means of gears 44.

Thus it will be seen that the paste is fed toward the discharge end of the feed chamber 10 and is gradually compressed more and more as it approaches the discharge end. At the same time, grids are fed edgewise between the compressors 17 and 18 which rotate in opposite directions, as before stated. The paste passes through the blades of the first compressor 17 and is forced into the open spaces of the grids, and compressed by the rotating blades so as to fill all portions of the openings of the grid. At the same time, the revolving blades wipe or smooth the outer surfaces of the grid, and when the latter emerges from the machine, it is in the same condition as if it had been pasted by hand, and its surfaces smoothed by hand operated means. This operation is carried on continuously, with the result that the grids are pasted quite rapidly and effectively.

It will be obvious that in the construction of the machine, numerous parts may be varied considerably, without departing from the spirit and scope of the invention, and I do not desire to be limited to any specific details, except so far as I am expressly limited by the terms of the appended claims.

Having thus described my invention, what I claim is:

1. In a grid pasting machine, the combination with a feeding chamber, means for continuously feeding paste to the said chamber, means adjacent the end of said chamber for receiving a grid, and means located at one side of the grid receiving part adapted to force the paste from the feeding chamber into the interstices of the grid from one side thereof only.

2. In a grid pasting machine, a feeding chamber, means for feeding material through said chamber, receiving means for a grid adjacent the end of said chamber, means for forcing paste into the openings in the grid from one side thereof only, and means upon the opposite side of the grid for smoothing the surface thereof.

3. In a grid pasting machine, means for receiving a grid, means for feeding paste to and forcing the same into the openings in the grid from one side only, and means upon the opposite side of the grid adapted to assist in the compression of the paste in the spaces of the grid, and to remove the excess material from the surface of the grid.

4. In a grid pasting machine, the combination with means for receiving a grid, a feeding chamber for the paste material, means for receiving the material from the feeding chamber and forcing the same into the openings in the grid from one side only of said grid, and means upon the opposite side of the grid adapted to assist in the compression of the material within the grid.

5. In a grid pasting machine, the combination with a feeding chamber, means within said feeding chamber for moving the material through the chamber, a mixing chamber opening into the said feeding chamber, means within said mixing chamber for mixing the material supplied thereto and forcing it into the feeding chamber, means for supporting a grid adjacent one end of said feeding chamber, and in position to receive material from said feeding chamber at one side of the grid only.

6. In a grid pasting machine, the combination with a feeding chamber, feeding mechanism within the said chamber for feeding the material through the chamber, means for operating said feeding mechanism, a connection between said feeding mechanism and its operating mechanism, said connection including a clutch capable of slipping, and means for supporting a grid adjacent the outlet end of the feeding chamber.

7. In a grid pasting machine, a feeding chamber, feeding mechanism in said chamber for feeding material through the chamber in one direction only, means for supporting a grid adjacent one end of said chamber, a compressor adapted to force the material from the feed chamber into the openings in said grid, and a compressor upon the opposite side of said grid adapted to assist in the compression of the material within the openings in the grid.

8. In a grid pasting machine, a feeding chamber, mechanism within said chamber for feeding material through said chamber, means for supporting a grid adjacent one end of said chamber, a compressor adapted to receive material from the feeding chamber and force the same into the openings in the grid, means for operating said compressing means at a substantially constant speed, and means for operating the feeding means within the feeding chamber, said operating means including a slip connection.

9. In a pasting machine, a feeder comprising a feeding chamber, rotary means for feeding paste lengthwise thereof and for compressing the same toward the discharge end, a pair of rotary wheels having blades located adjacent the discharge end of the chamber coaxially therewith, said wheels being spaced apart, and means for feeding the grids at right angles to the axis of the feeder, through the space between said wheels, and means for rotating the feeding means and for rotating the said wheels in opposite directions, and at a higher rate of speed than that at which the feeder is rotated.

10. In a grid pasting machine, the combination with a feeding chamber closed at one end, means adjacent the closed end of the chamber for receiving a grid, and means for forcing paste into the interstices of a grid from one side only thereof.

11. In a grid pasting machine, the combination with a feeding chamber closed at one end, an opening adjacent the closed end of said chamber adapted to receive a grid, means for continually feeding grids through the said opening, and means for forcing paste into the interstices of the grid from one side only.

12. In a grid pasting machine, the combination with a feeding chamber closed at one end, means adjacent the closed end of the chamber for receiving a grid, means for forcing paste into the interstices of the grid from one side of the grid only, and means for coöperating with a surface of the grid for wiping off the excess material.

13. In a grid pasting machine, the combination with a feeding chamber closed at one end, means adjacent the closed end of the chamber for receiving a grid, means for forcing paste into the interstices of the grid from one side thereof only, and means coöperating with the opposite side of a grid for wiping off the excess material.

14. In a grid pasting machine, the combination with a feeding chamber closed at one end, means at one end of the chamber for receiving a grid; means for feeding paste to, and forcing the same into the openings in said grid from one side only, and means upon the opposite side of the grid adapted to assist in the compression of the paste in the grid and to remove the excess material from the surface of the grid.

In testimony whereof, I hereunto affix my signature in the presence of two witnesses.

THEODORE A. WILLARD.

Witnesses:
  N. C. HUBBARD,
  A. F. KWIS.